(12) United States Patent
Hadley

(10) Patent No.: US 8,047,320 B2
(45) Date of Patent: Nov. 1, 2011

(54) ADJUSTABLE POWER UNIT MOUNTING ATTACHMENT FOR VEHICLE

(75) Inventor: Robert Hadley, Yorba Linda, CA (US)

(73) Assignee: Razor USA, LLC, Cerritos, CA (US)

( * ) Notice: Subject to any disclaimer, the term of this patent is extended or adjusted under 35 U.S.C. 154(b) by 177 days.

(21) Appl. No.: 12/267,433

(22) Filed: Nov. 7, 2008

(65) Prior Publication Data

US 2010/0117327 A1    May 13, 2010

(51) Int. Cl.
*B62M 6/60* (2010.01)
*B62M 6/90* (2010.01)

(52) U.S. Cl. .................. 180/206.5; 280/214; 280/288.4; 180/11; 180/207.3

(58) Field of Classification Search ............... 280/214, 280/288.4, 212; 180/205, 220, 206.5
See application file for complete search history.

(56) References Cited

U.S. PATENT DOCUMENTS

| | | | | |
|---|---|---|---|---|
| 598,819 | A * | 2/1898 | Scott | 180/220 |
| 3,978,936 | A * | 9/1976 | Schwartz | 180/222 |
| 4,113,043 | A * | 9/1978 | Palmer | 180/221 |
| 4,267,898 | A | 5/1981 | Wheaton | |
| 5,524,726 | A | 6/1996 | Wright, Jr. | |
| 5,865,267 | A | 2/1999 | Mayer et al. | |
| 5,934,401 | A | 8/1999 | Mayer et al. | |
| 5,937,964 | A | 8/1999 | Mayer et al. | |
| 6,024,186 | A * | 2/2000 | Suga | 180/291 |
| 6,155,369 | A | 12/2000 | Whittaker | |
| 6,347,682 | B1 | 2/2002 | Buchner | |
| RE37,583 | E | 3/2002 | Mayer et al. | |
| 6,516,911 | B1 | 2/2003 | Mayer et al. | |
| 6,557,657 | B2 | 5/2003 | Persson | |
| 7,104,351 | B2 * | 9/2006 | Robbins | 180/181 |
| 7,150,337 | B2 | 12/2006 | Phillips et al. | |
| 2001/0022246 | A1 * | 9/2001 | Dunbridge et al. | 180/65.8 |
| 2003/0111284 | A1 * | 6/2003 | Chou et al. | 180/220 |
| 2004/0065495 | A1 * | 4/2004 | Huang | 180/220 |

FOREIGN PATENT DOCUMENTS

| | | |
|---|---|---|
| DE | 888 056 | 8/1953 |
| DE | 298 13 247 | 11/1998 |
| JP | 9175472 | 8/1997 |
| WO | WO 2008 089499 | 7/2008 |

OTHER PUBLICATIONS

International Search Report for PCT/US2009/063445 mailed on Jan. 5, 2010 in 10 pages.

* cited by examiner

*Primary Examiner* — Tony H. Winner
*Assistant Examiner* — Wesley Potter
(74) *Attorney, Agent, or Firm* — Knobbe, Martens, Olson & Bear, LLP

(57) ABSTRACT

A powered cycle vehicle having an adjustable mounting system for a power unit is described. A power unit is attached to a wheel mounting bracket which is affixed to the vehicle frame and carries the cycle wheel. The wheel mounting bracket may be a unitary structure that defines a wheel mount location and a power unit mount location. Adjustment of the power unit can be made independently of adjustment of the cycle wheel.

18 Claims, 7 Drawing Sheets

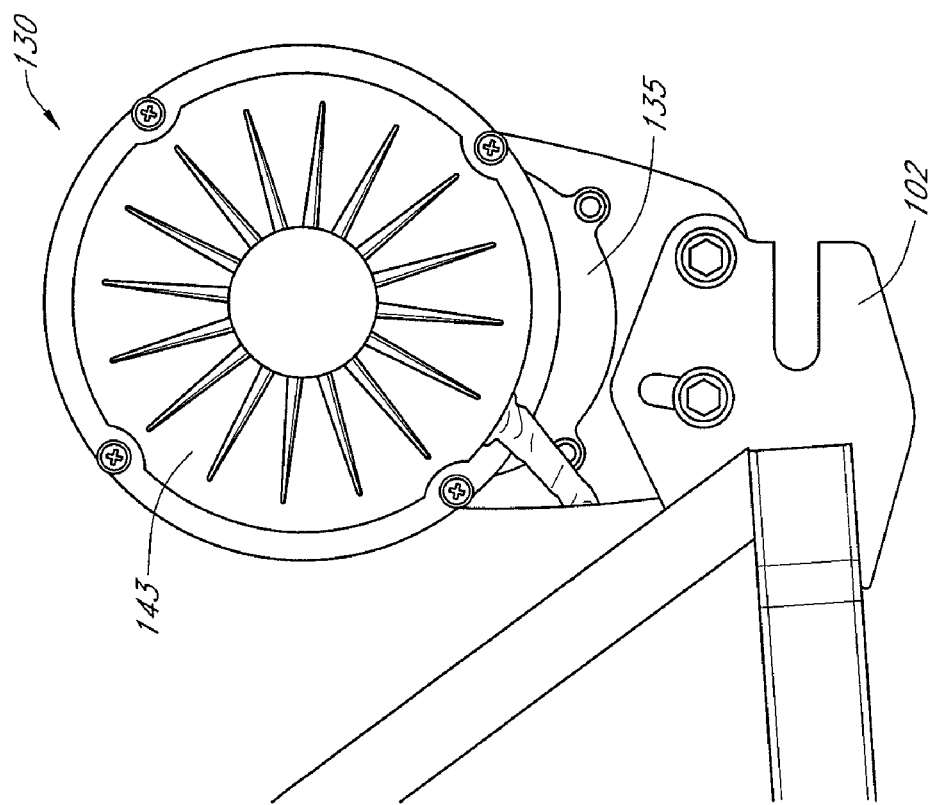
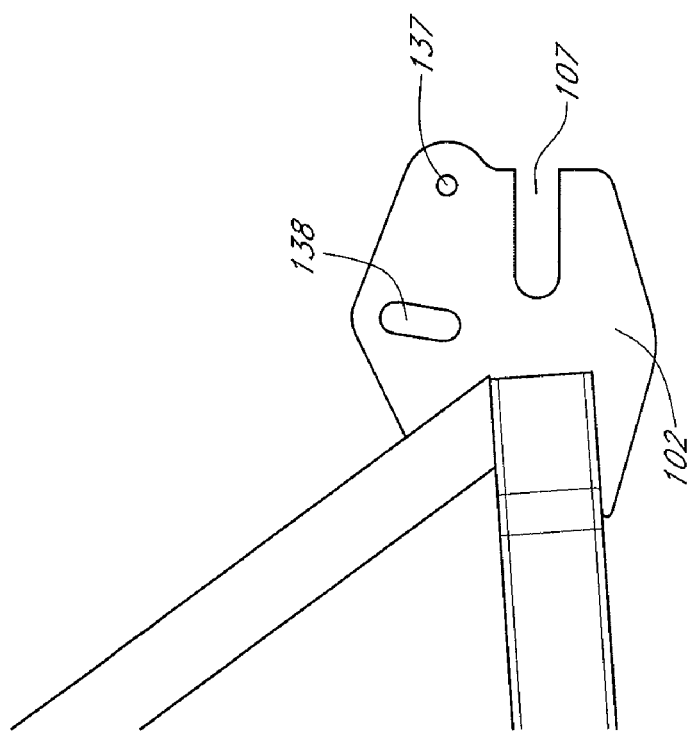
FIG. 6B
FIG. 6A

ADJUSTABLE POWER UNIT MOUNTING ATTACHMENT FOR VEHICLE

BACKGROUND OF THE INVENTION

1. Field of the Invention

The present invention relates to cycle vehicles, such as scooters or bicycles with two wheels and other related vehicles having more or fewer wheels. More specifically, the present invention relates to powered and/or power-assisted versions of cycle vehicles.

2. Description of the Related Art

Motors, including electric motors, have long been used to power lightweight vehicles such as scooters or bicycles. Various designs have been proposed to couple a motor to the bicycle as well as to transfer the power from the motor to the wheels which contact the ground. Various locations for the motor have been proposed and various attachment schemes. Some have described placing a motor on a rack above the rear wheel, while others have placed a drive unit below the seat and others have attached a motor bracket to the wheel itself. Frequently, the power system will be attached to the existing bicycle frame by clamping the motor to one of the existing tubes of the frame. Various methods proposed in the prior art for transferring power from the motor to the wheels include the drive systems, chain drive systems, and gear drive systems.

Difficulties presented by various systems include problems related to aligning or maintaining alignment of the motor with the wheel it is coupled to, difficulties in removing the wheel or reinstalling the wheel during maintenance, and creating a system that is small enough, light enough, and inexpensive enough to be suitable for widespread use. For example, when the motor bracket is attached directly to the wheel, removal, installation, and handling of the wheel during maintenance procedures can be awkward due to the presence of a heavy object pivoting around the axle of the wheel. Such a system also interferes with accessing the spokes, the hub, and the bearings in cases where these require servicing. Attachment devices in which the motor is clamped to tubes, such as the existing frame tubes, require a separate step to properly align the motor. Due to the forces involved with the presence of the motor, it is not unusual for the motor to twist out of alignment in such clamp arrangements during operation or if bumped, requiring realignment for optimum operation.

In addition, accurate and repeatable relative location of drive and driven portions of belt, chain or gear systems is important to achieve reliable operation of these systems. Improper adjustment of the proximity can result in chains or belts falling off, increased resistance, increased wear of parts, and unreliable transmission of drive forces. Existing electric bicycles or scooters employ mounting arrangements for the motor or other drive unit that are overly complex, difficult to adjust or maintain and expensive to manufacture.

SUMMARY OF THE INVENTION

Preferred embodiments of the present powered cycle vehicle are configured to secure the power unit near a desired position on the vehicle while providing favorable and adjustable orientation between portions of the vehicle drive system. Preferred embodiments also are cost-effective to manufacture, thus permitting the system to be employed on lower price-point vehicles.

A preferred embodiment is a powered cycle vehicle, the vehicle including a frame and a mounting bracket affixed to the frame, a cycle wheel, a power unit, and a driven wheel. The mounting bracket having a first surface and defining a first thickness extending from the first surface, the first surface having a first opening, the first opening having a length, a width, and a depth, the length being greater than the width and the depth passing through the first thickness at an edge of the mounting bracket, and the first opening being sized to receive a wheel axle. The mounting bracket having a second surface and defining a second thickness extending from the second surface, the second surface having an elongate slot, the elongate slot passing through the second thickness, and the elongate slot being sized to be able to receive two or more fasteners. The cycle wheel having a central hub and a wheel axle that rotatably supports the hub, the wheel axle defining a first axis, and the cycle wheel being affixable to the cycle vehicle by securing the wheel axle within the first opening. The power unit having a shaft, and a drive wheel, the shaft defining a second axis, the drive wheel having a drive surface, and the drive wheel operably connected to the shaft, the power unit being slidably positionable and lockable to the mounting bracket in a first position and in a different second position along the elongate slot, the second axis being substantially parallel to the first axis when the power unit is positioned on the second surface. The driven wheel having a driven surface and a central opening, the driven surface being adapted to directly or indirectly engage the drive surface of the drive wheel, the central opening being sized for passage of the axle, and the driven wheel operably connected to the cycle wheel.

Another preferred embodiment is a powered cycle vehicle, the vehicle including a frame, a cycle wheel, a driven wheel, and a mounting bracket. The cycle wheel, having a wheel axle, the wheel axle defining a first axis, the wheel axle rotatably supporting the cycle wheel. The driven wheel operably connected to and in proximity to the cycle wheel, the driven wheel having a driven surface. The mounting bracket affixed to the frame, and the cycle wheel rotatably attached in a locked position to the mounting bracket. The power unit having a motor and a drive wheel, the drive wheel operably connected to the motor and rotatably connected to the driven surface. The power unit slidably positionable on the mounting bracket to allow moving the drive wheel in relation to the rear wheel axis to facilitate disengagement of the drive wheel from the driven surface and removal of the cycle wheel from the mounting bracket.

Another embodiment is a powered cycle vehicle, the vehicle including a frame, a cycle wheel, a driven wheel, and a power unit. The frame having a first mounting surface and a second mounting surface. The cycle wheel, having a wheel axle, the wheel axle rotatably supporting the cycle wheel and defining a first axis, and the cycle wheel rotatably attached in a locked position to the first mounting surface. The driven wheel operably connected to and in proximity to the cycle wheel, the driven wheel having a driven surface. The power unit having a motor and a drive wheel, the drive wheel operably connected to the motor and rotatably connected to the driven surface. The power unit slidably positionable on the second mounting surface to allow moving the drive wheel in relation to the rear wheel axis to facilitate disengagement of the drive wheel from the driven surface and removal of the cycle wheel from the first mounting surface.

BRIEF DESCRIPTION OF THE DRAWINGS

These and other features, aspects, and advantages of the present invention are described below with reference to drawings of preferred embodiments, which is intended to illustrate, but not to limit the present invention. The drawings contain six figures.

FIG. 6a, FIG. 6b and FIG. 6c are side views of a portion of the cycle vehicle showing a mounting bracket without a power unit, with a power unit attached in a first position and with a power unit attached in a second position, respectively.

DETAILED DESCRIPTION OF THE PREFERRED EMBODIMENTS

Figure 1:
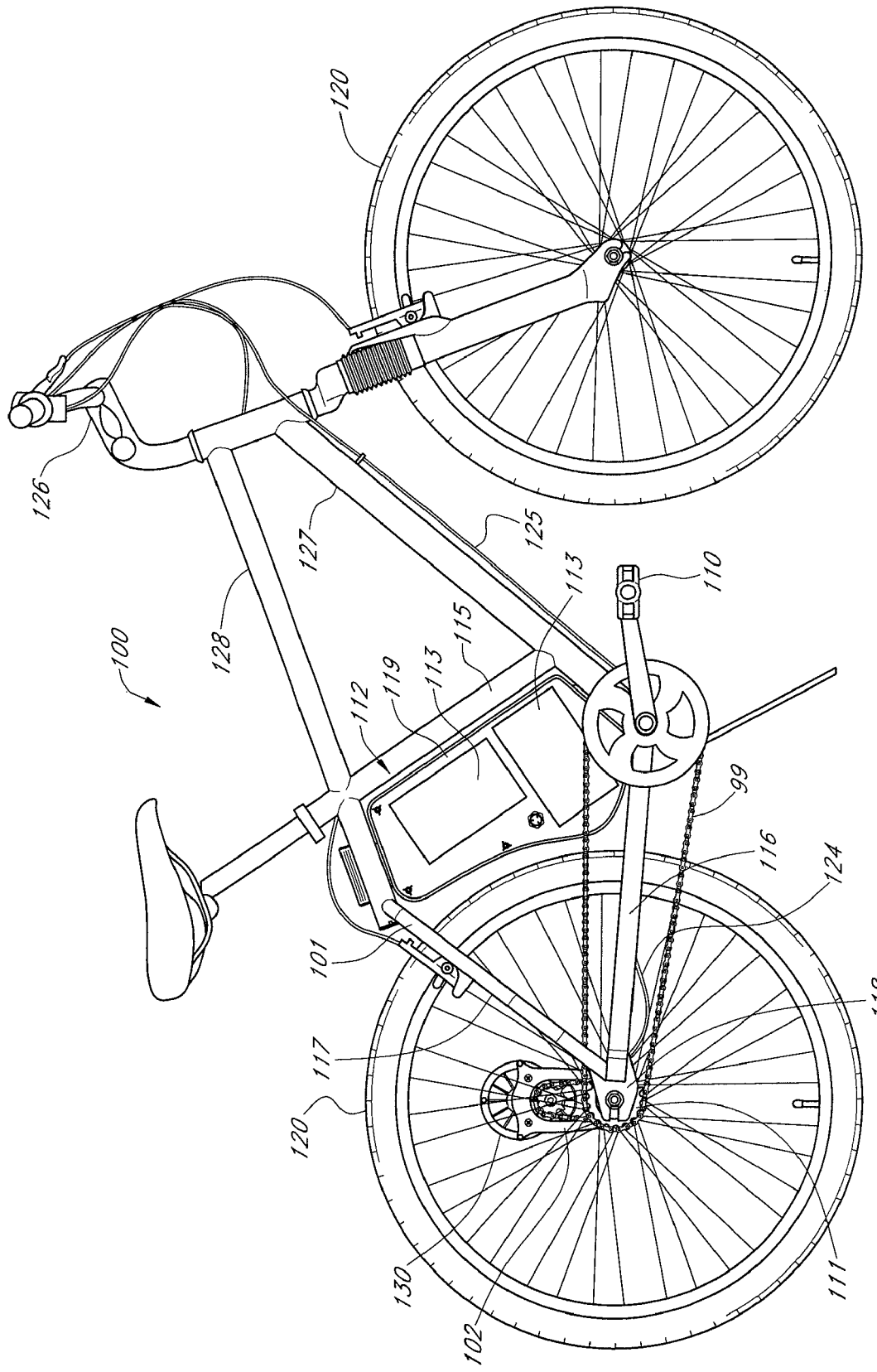
FIG. 1 is a side view of a powered cycle vehicle having two cycle wheels.

FIG. 1 illustrates a preferred embodiment of a powered cycle vehicle 100. In the illustrated arrangement, the vehicle is a bicycle including a single front wheel and a single rear wheel. However, the vehicle may be of other types as well, including a scooter, for example, and may include a different number of wheels. The illustrated powered cycle vehicle 100 includes cycle wheels 120, a pedal crank assembly 110 including a drive sprocket, a driven sprocket and one-way clutch (e.g., freewheel) assembly 111, an endless loop (e.g., a belt or a chain) 99 drivingly coupling the pedal crank assembly 110 and the driven sprocket 111, a power unit 130, a power kit 112 with a power source (e.g., one or more batteries) 113, and a seat tube 115. In one embodiment, the power unit 130 includes a drive source (e.g., a motor) 143 attached to a mounting bracket 102, which in turn is attached to the rear portion of the frame 101. Various methods can be used to attach the mounting bracket 102 to the frame 101, including adhesives, brazing, soldering, bolting, and welding, for example. In certain applications, permanent attachment methods may be desirable over non-permanent attachment methods. In some cases, the mounting bracket 102 or a portion of the mounting bracket 102 can be formed as a part of a bicycle tube, such as a chain stay 116, a seat stay 117, or a wheel support bracket (often referred to as a dropout) 118. The illustrated dropout 118 allows for fore and aft adjustability of the rear wheel 120 such that the tension of the drive chain (or belt) 99 can be adjusted and such that the rear wheel 120 removed, as necessary or desired. In the illustrated arrangement, the dropout 118 includes a generally horizontal slot configured to receive the axle of the rear wheel 120, which allows the rear wheel 120 to move relative to the pedal crank assembly 110 and to be removed from the dropout 118 through a rearward open end of the slot. The power unit 130 can be attached with various types of fasteners, such as, bolts, screws, studs, nuts, clips, snaps, buckles, pins, etc. In some embodiments, the fasteners can have features for hand operation such as handles, T-handles, levers, quick release mechanisms, etc. In some embodiments, the fasteners can have features for tightening by tools including wrenches, sockets, pliers, hex key wrenches, screwdrivers, etc. In some embodiments, a portion or all of the fasteners can be pressed into at least one of the parts being fastened.

The power kit 112 shown includes a case 119, and batteries 113. However suitable power kits 112 can have fewer features, such as without a case or with fewer batteries, or more features, such as an attachment strap, multiple batteries, battery management system, carrying handle, straps or clips or other features for attaching the power kit to the cycle vehicle, as well as other useful features and combination of these features. Various power management systems can be utilized, either located with the power kit or positioned elsewhere on the cycle vehicle or separately from the cycle vehicle, including those with features related to charging and/or discharging the battery. Power/communication wires 124 can be routed between the power kit 112 and the power unit 130, and can be routed in various ways including along a chain stay 116, or along a seat stay 117. The wires 124 may provide power from the power kit 112 to the power unit 130. In some arrangements, the wires 124 may also perform other functions, such as communicating control signals, among other uses. Control wiring 125, such as for a throttle and/or brake switches can be routed to an appropriate location, such as to handlebars 126 via a downtube 127, or along another route, such as along a top tube 128 or other positioning as might be appropriate. The control wiring 125 preferably communicates a control signal from the operator control (e.g., the throttle) to the power kit 112 and/or other inputs (e.g., sensors). The power kit 112 preferably is configured to provide power to the power unit 130 in response to the control signal in accordance with a suitable control strategy. Attachment features for the power kit 112 may include one or more of the following: swing out capability, slide in capability, integral handle, integration of a handle with an attachment fixture, shock absorption, quick connects for wires such as the control wires and the power wires, connector for outside power for charging purposes, and a charging cord that is extendable from the power kit to a wall socket or some other charging source.

In various embodiments, such as when a power kit is positioned rearward of a seat tube, additional space suitable for the power kit can be introduced between the seat tube and a rear cycle wheel by adjustment of the geometry, such as by attaching the seat tube intermediate along a downtube at a position forward of the axis of the pedal crank assembly 110. In some embodiments, a frame geometry where the seat tube is more upright such as where the angle between the seat tube and a horizontal line intersecting the seat tube is approximately 70-90°. Such geometry, commonly referred to as "a steep seat angle," can be utilized in some embodiments, however this type of geometry can lead to a harsh ride, and can require production of more frame sizes for adequate fitting of a cycle vehicle to a rider. Preferable are angles between the seat tube and an intersecting horizontal line which are between about 50° and about 90°, and more preferable are angles between about 50° and about 70°, however even shallower angles can be utilized in various embodiments. Frames with these smaller angles, are generally referred to as having "relaxed" or "laid-back" geometry. Such laid-back geometry can be advantageous in that one size frame can be made to properly fit a greater range of riders because adjustment of the effective seat height (i.e., the linear distance between the seat and the axis of the pedal crank assembly 110) can be varied a significant amount without a correspondingly significant increase in the actual seat height (i.e., the vertical distance between the seat and the surface upon which the vehicle rests).

Figure 2:
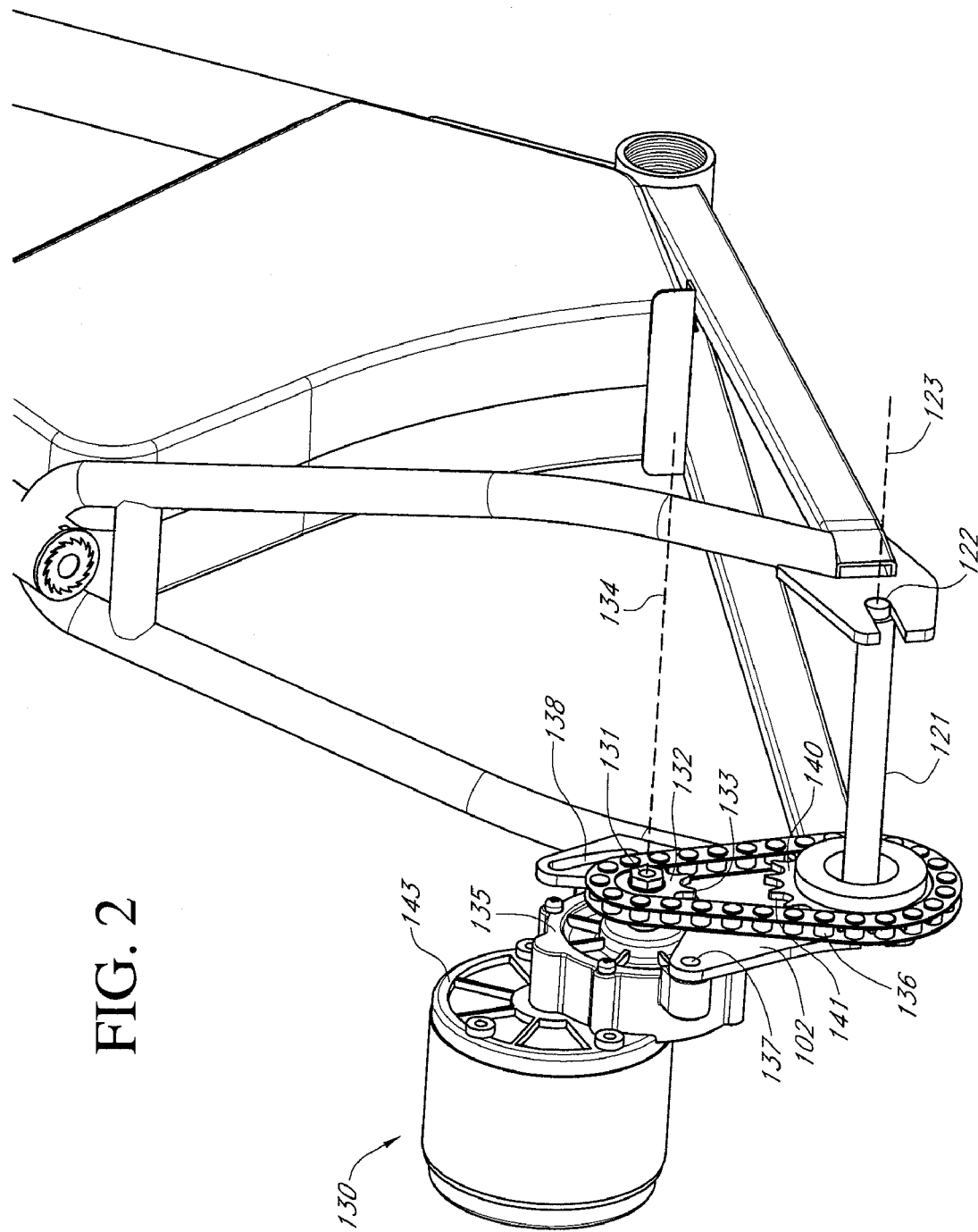
FIG. 2 is a perspective view of a portion of the cycle vehicle of FIG. 1 including the rear portion of the vehicle and the power unit.

FIG. 2 illustrates the power drive system of an embodiment. As discussed, the power unit 130 includes a drive source, such as a motor 143, and an optional gear reducer 135. The power unit 130 and, preferably, one of the motor 143 or gear reducer 135 is attached to a mounting bracket 102. In the illustrated arrangement, the gear reducer 135 is provided and is coupled to the mounting bracket 102. In the illustrated arrangement, the output shaft 131 of the power unit 130 is attached to a drive wheel (e.g., sprocket) 132 which is operably linked to a driven wheel (e.g., sprocket) 140 through an endless drive loop or member, such as a belt or the illustrated chain 136, engaging a drive surface 133 of the drive wheel 132 and a driven surface 141 of the driven wheel 140. The drive system can utilize a number of different techniques for operably linking the drive wheel 132 and the driven wheel 140. For example, the drive wheel 132 and a driven wheel 140 can be sprockets linked by a chain, or they can be pulleys linked by a belt, or they can be gears contacting each other directly, or they can be wheels having a relatively smooth face bearing upon each other with faces being on the perimeter, a side face, or a beveled face. In additional embodiments, variations on these drive and driven wheel systems can include idler wheels, compound drive systems such as where an intermediate wheel is utilized, or where a combination of different types of wheels are used.

The driven wheel 140 is operably connected to the hub 121 of the cycle wheel 120 and preferably includes a one-way clutch mechanism that allows the driven wheel 140 to drive the wheel 120 but also permits the wheel 120 to freewheel when the power unit 130 is off or to permit the wheel 120 is rotate faster than the power unit 130. Also shown are the axis 123 defined by the wheel axle 122 and the axis 134 defined by the output shaft 131. In this embodiment, the output shaft axis 134 and the wheel axle axis 123 are approximately parallel in alignment. Such alignment can facilitate smooth and efficient operation of many drive systems.

In the illustrated arrangement, the left side mounting bracket 102 defines both a surface for attachment of the power unit 130 and a surface for attachment of the cycle wheel axle 122. The orientation of these two surfaces can define the alignment and relative orientation of the wheel axis 123 and output shaft axis 134. While the orientation of these axes can also be dependent on the use of additional features, such as wedges, shims, spacers, etc., it is generally preferred for reasons including maintenance, assembly, and cost for the surfaces themselves to define the orientation of the axes. Thus, the illustrated arrangement of having a unitary bracket 102 define the surface for locating the wheel axle 122 and the surface for locating the power unit 130 permits the drive wheel 132 and the driven wheel 140 to be reliably aligned. Moreover, the illustrated arrangement is cost-effective to manufacture thereby allowing the power unit 130 to be utilized on lower price-point vehicles than currently available.

The mounting bracket of this embodiment also includes a first mount location or fastener point 137 which serves as a pivot point and a second mount location that, in the illustrated arrangement, is a slot 138 and allows movement of the power unit 130 in a rotational manner about the first mount location 137. Such an arrangement allows the spacing between the drive wheel 132 and the driven wheel 140 to be changed, such as during assembly or maintenance operations including when it is necessary or desirable to remove the wheel 120. The pivot and slot arrangement of this embodiment also allows for adjustment of the cycle wheel hub 121 and driven wheel 140 position in a separate step from adjustment of the drive wheel 132 position.

Such independent adjustment can simplify assembly and maintenance of the powered cycle vehicle in that the orientation and location of the cycle wheel hub 121 can be adjusted for such things as proper tracking of the vehicle and proper relationship of the wheel 120 with other features of the vehicle including the pedal drive system 110 and a braking system, and the orientation of the drive wheel 132 can be adjusted separately of these other considerations. Moreover, the power unit 130 can be easily moved to allow the chain 136 to be removed from the drive wheel 132 so that the rear wheel 120 can be removed from the cycle frame for any desired purpose, such as fixing a flat tire or replacement of the tire, for example. The rear wheel 120 can then be reassembled to the cycle frame, the chain 136 re-coupled with the drive wheel 132, and the chain tension of the chain 136 can be adjusted by rotation of the power unit 130 about the pivot axis defined by the first mount location 137.

Figure 3:
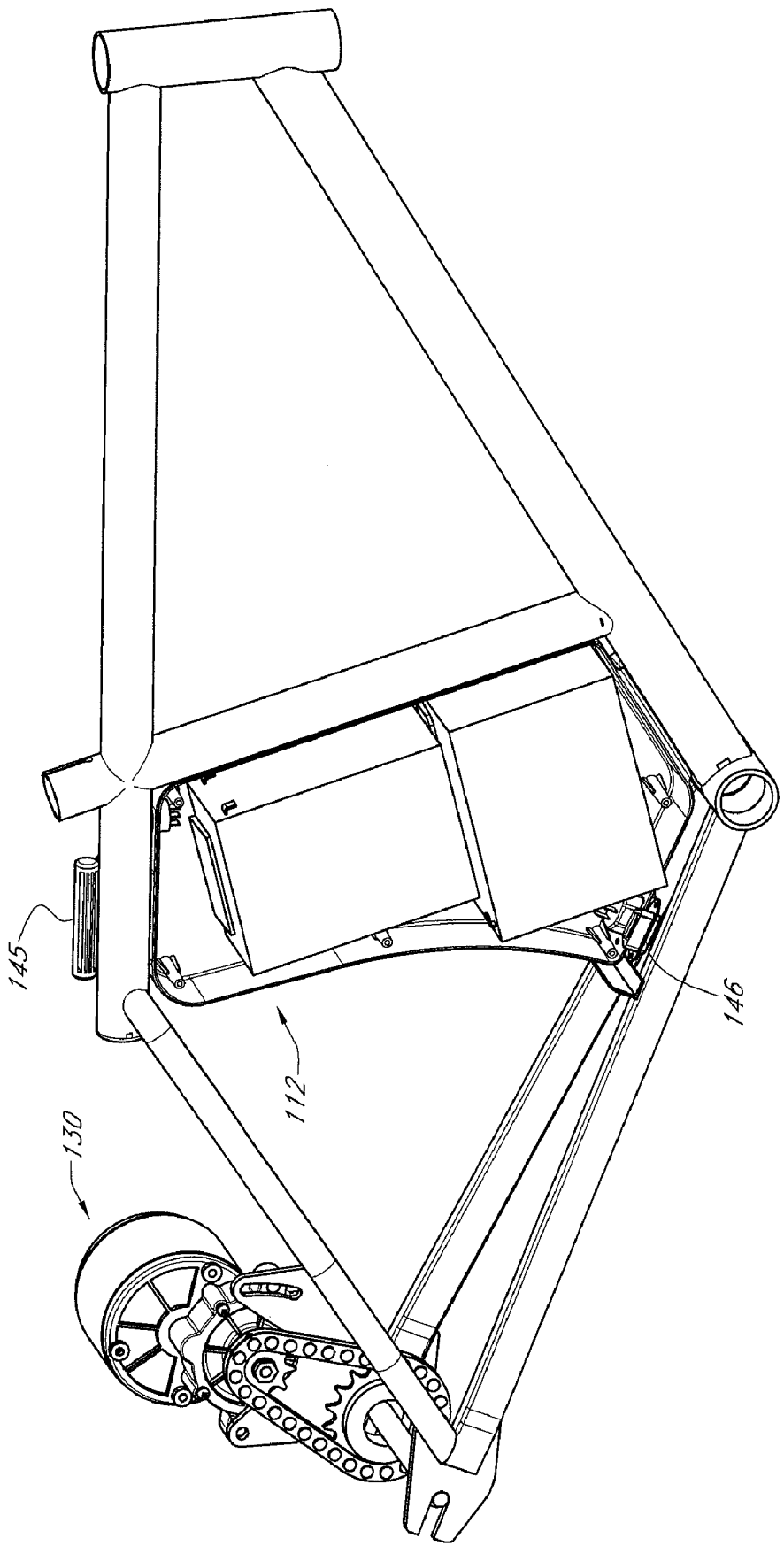
FIG. 3 is a perspective view of a portion of a cycle vehicle of FIG. 1 including power unit, mounting bracket, and power kit.

FIG. 3 illustrates the frame, power kit 112 and power unit 130 with other components removed for clarity. FIG. 3 illustrates a handle 145 and an electrical plug 146 in the power kit 112. The handle 145 can be round, square, or some other shape suitable for grasping and carrying. In addition, the handle 145 can be integrated with the attachment system of the power kit 112 to the frame. Additional handles can be integrated into or attached to the power kit 112 as necessary or convenient for handling or carrying the power kit 112. Electrical connectors 146 can be provided to connect the power kit 112 to the power unit 130 and the operator controls, as well as providing power to charge the battery either from an external charger or from another external power source. One, two, or more electrical connectors can be used. The location of electrical connectors 146, while preferably located on the bottom of the power kit 112, can successfully be positioned at other locations including the sides, the front, the back, the top, as well as a combination of these locations.

Figure 4:
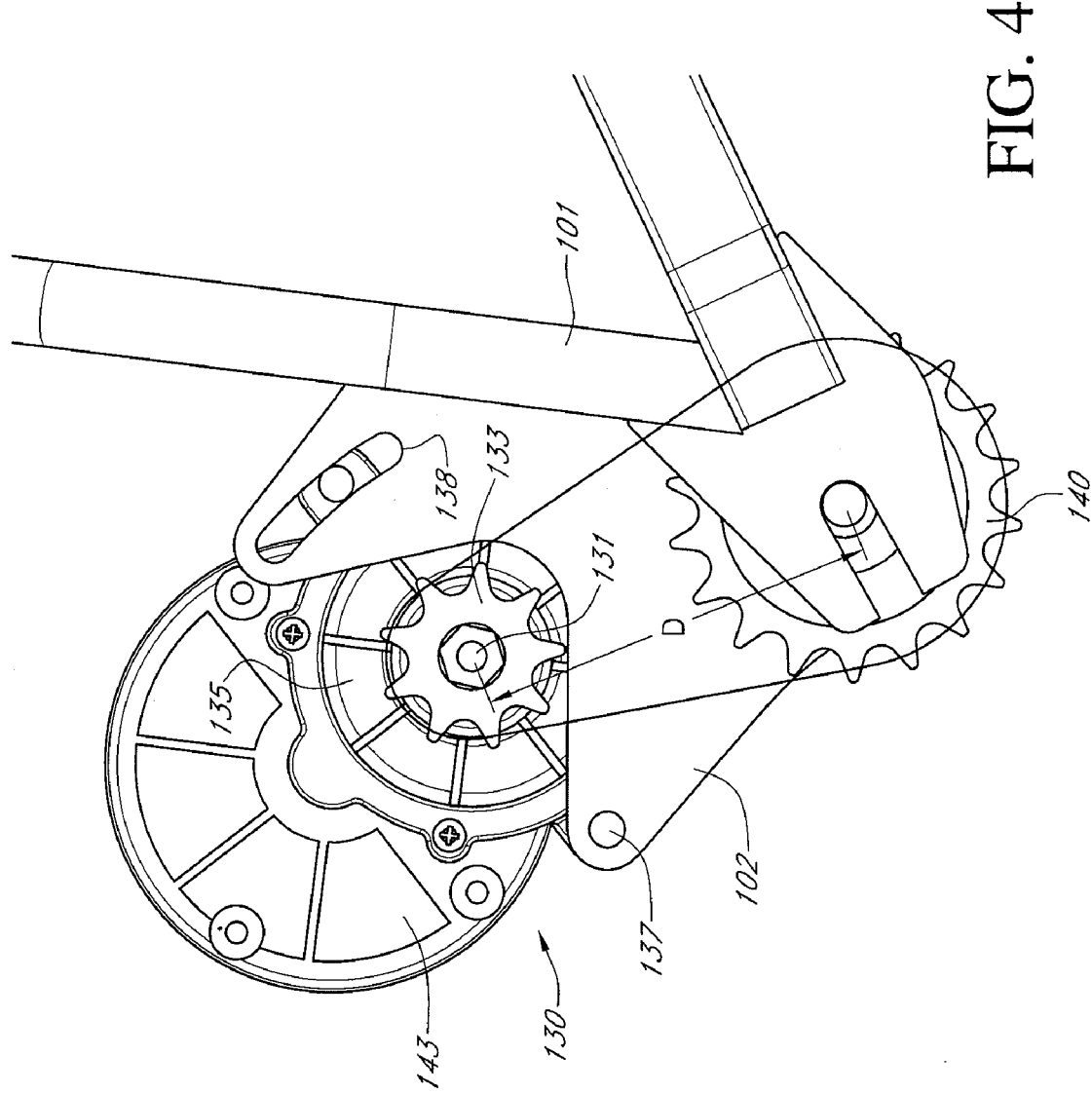
FIG. 4 is a side view of a portion of the cycle vehicle of FIG. 1 including a power unit, mounting bracket, drive wheel, and driven wheel.

FIG. 4 illustrates the attachment of the power unit 130 to the frame 101 with other components removed for clarity. In FIG. 4, the motor 143 is attached to the optional gear reducer 135. The output shaft 131 is attached to the drive wheel 133. The gear reducer 135 is fastened to the mounting bracket 102 at the pivot point 137 and the slot 138 by suitable fasteners, such as a bolt and nut combination, for example. As discussed above, this pivot-slot arrangement allows the position of the drive wheel 133 to be slidably positioned and then locked into one of a multiple number of possible locations, such as by sliding the motor 143 and gear reducer 135 along the slot 138 and tightening one or more fasteners in the pivot point 137 or the slot 138. Accordingly, a distance D between the drive wheel 133 and the driven wheel 140 can be easily and quickly adjusted.

Figure 5B:
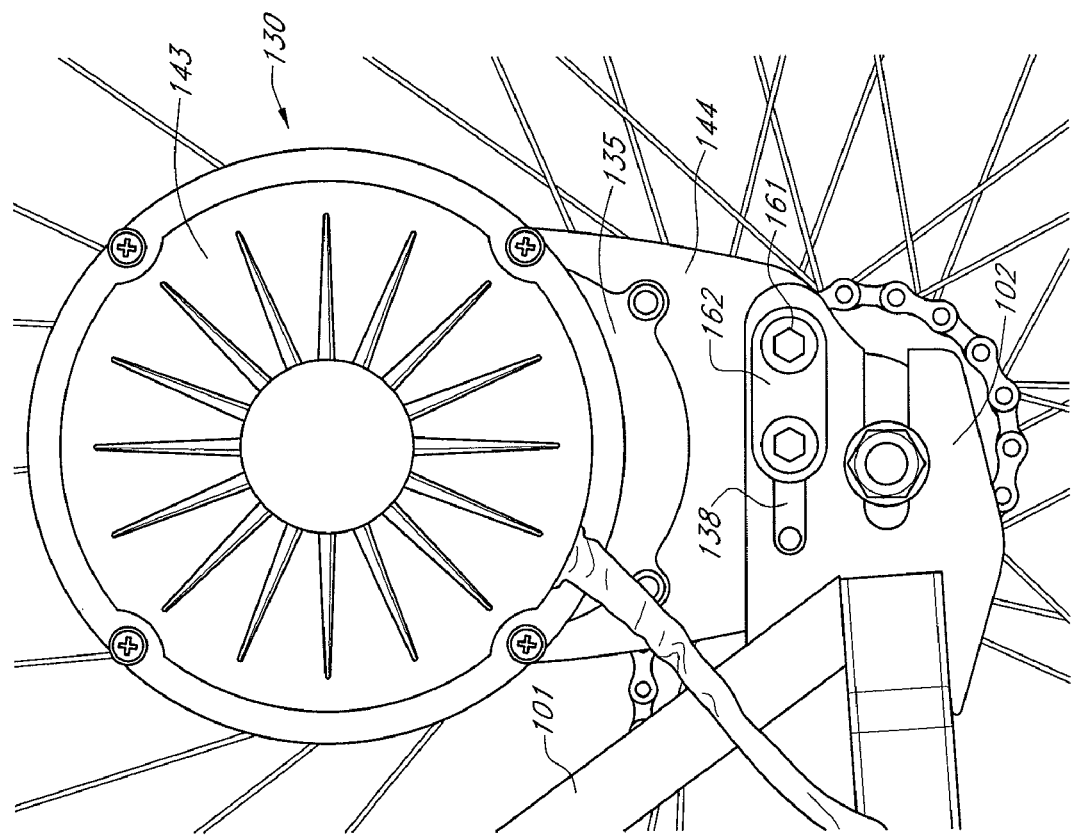
FIG. 5a and FIG. 5b are perspective views of a portion of a cycle vehicle showing a mounting bracket with and without a power unit, respectively.
Figure 5A:
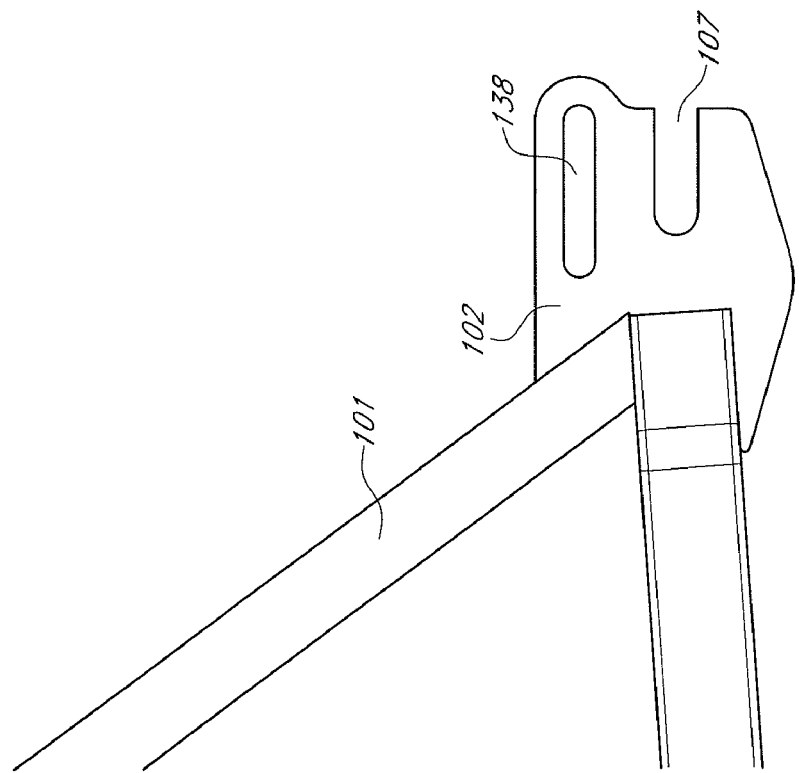
Figure 6C:
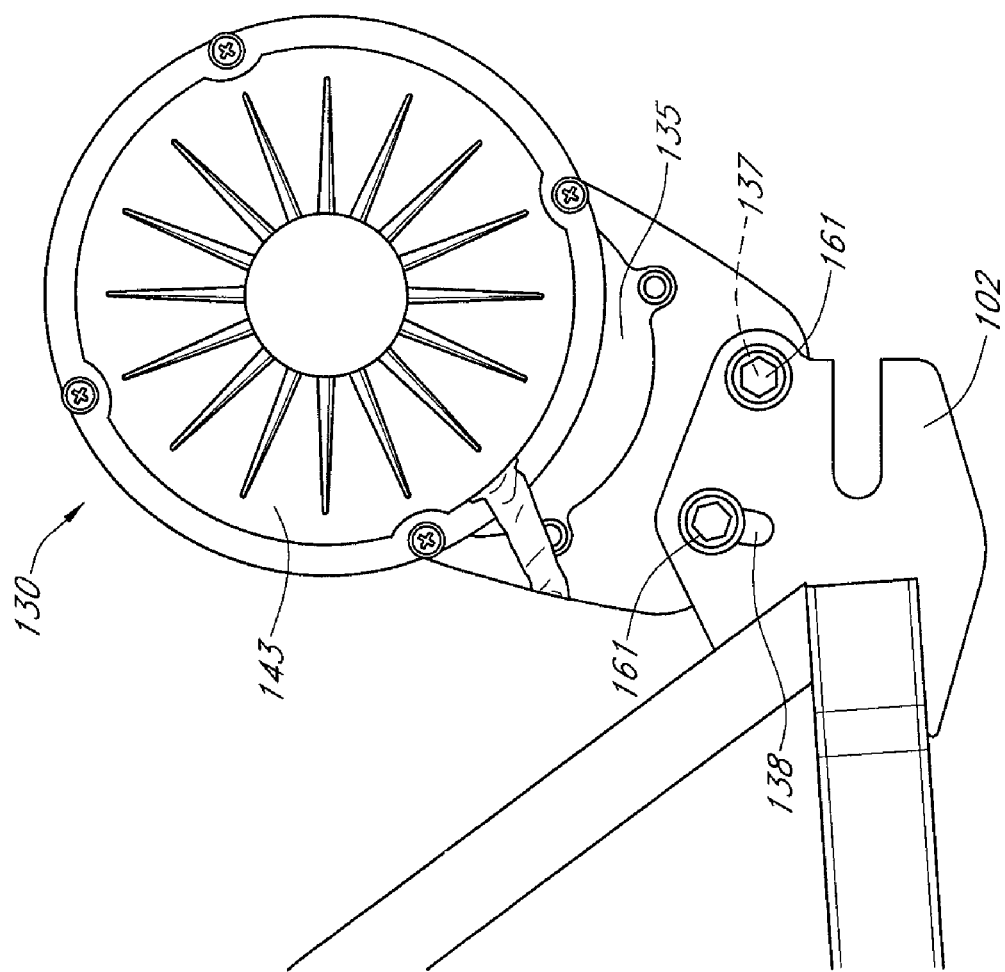

FIGS. 5a-5b illustrate an embodiment of a portion of a powered cycle vehicle where a power unit 130 including a motor 143, an optional gear reducer 135, and a motor bracket 144 is fastened to the mounting bracket 102 and the mounting bracket 102 is affixed to the frame 101. FIG. 5a illustrates the cycle frame alone and FIG. 5b illustrates the cycle frame with the power unit 130 mounted thereto. The motor bracket 144 is affixed to a linear slot 138 in the mounting bracket 102 by way of two spaced apart fasteners 161, however fewer or more fasteners can alternatively be used. The slot 138 in the mounting bracket 102 provides slidable adjustment to change the position of the drive wheel 133 in relation to driven wheel 140 attached to the cycle wheel 120. In addition, the slot 138 can be oriented horizontally, vertically, or at an intermediate angle. An attachment structure for a cycle wheel is shown as slot 107. Further, although two fasteners are shown, alternative arrangements can be used to prevent rotation of the power unit 130 relative to the mounting bracket 102. FIGS. 6a, 6b and 6c illustrate an embodiment in which a power unit 130 includes a motor 143 and gear reducer 135. The motor 143 and gear reducer 135 are coupled to a mounting bracket 102 through a motor bracket 144. The motor bracket 144 is attached to the mounting bracket 102 with a fastener 161 at a first fastener point 137 which can act as a pivot point, and at a slotted fastener location 138 (see FIG. 6a) which can allow for relative movement of the motor 143 and mounting bracket 102 by sliding along the slotted fastener location 138, and allowing the relative position of the motor 143 and mounting brackets 102 to be locked into a first position (FIG. 6b) and a second position (FIG. 6c), such as by tightening one or more fasteners 161. An attachment location for a cycle wheel 120 is shown as slot 107.

Appropriate fasteners for the embodiments shown in FIGS. 1-6 include any of the fasteners previously described including bolts, screws, etc. In some embodiments, when a threaded fastener is used, a nut can be utilized with the fastener to tighten the brackets or the power unit and the mounting bracket together. In some embodiments the nut can be welded or otherwise non-rotatably attached to one of the parts and fastened. In some embodiments, a bracket or the power unit 130 can be sized and threaded to receive a threaded fastener, and the threaded fastener can pass through the other bracket or the power unit and be tightened into the threaded part.

In some embodiments, an insert 162, as in FIG. 5, can be utilized in conjunction with one or more fastener. Such inserts can serve to interconnect a pair of fasteners at spaced locations or otherwise create a structure that resists rotation of the power unit 130 within the slot 138 (or other similar mounting location). The insert can also serve to increase or decrease the frictional contact force between the fastener and the face of the bracket or other part it is contacting, such as in the manner of a flat washer or a lock washer. In some embodiments, an insert interacts with only one fastener. In some embodiments, an insert can interact with more than one fastener.

In some embodiments, a slot or a slotted fastening point can be utilized in the attachment of a motor, a gear reducer, or an intermediate mounting bracket to a wheel support bracket to form a fastened combination. In some embodiments, the slot or slotted fastening point can be present in one part of the fastened combination, in some embodiments, the slot or slotted fastening point can be present in the other parts of the fastened combination, and in some embodiments, the slot or slotted fastening point can be present in both parts of the fastened combination. In some embodiments a slot or slotted fastening point can be present in a motor, a gear reducer, a motor bracket, a wheel mount bracket, or in some combination of these.

In some embodiments, especially when there are two or more fasteners, at least one of the fasteners can be a pin. In some such embodiments, a pin can be utilized which serves to allow rotation, but may or may not significantly prevent the two parts being fastened from splitting apart. That is, the pin may not necessarily be designed or intended to fasten objects together in anything other than a rotational sense. In some embodiments, a pin can be utilized which provides alignment along a slot or slotted fastening position, but does not substantially prevent splitting of the two parts being fastened.

In various embodiments, different numbers of cycle wheels can be utilized with a powered or power-assisted cycle vehicle. A cycle vehicle can be configured with two cycle wheels, for example in a configuration similar to a bicycle, scooter or otherwise, or it can be configured with fewer or more numerous cycle wheels. Various embodiments can include, for example, three or four or more cycle wheels. In some embodiments, only one cycle wheel may be present.

Although this invention has been disclosed in the context of a certain preferred embodiment and example, it will be understood by those skilled in the art that the present invention extends beyond the specifically disclosed embodiment to other alternative embodiments and/or uses of the invention and obvious modifications and equivalents thereof. In particular, while the present mounting arrangement has been described in the context of a particularly preferred embodiments, the skilled artisan will appreciate, in view of the present disclosure, that certain advantages, features, and aspects of the mounting arrangement may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment described above, but should be determined only by a fair reading of the claims.

What is claimed is:

1. A powered cycle vehicle, the vehicle comprising:
   a frame comprising a seat tube and a down tube,
   a mounting bracket supported by the frame and fixed to a rear portion of the frame;
       the mounting bracket having a first surface and defining a first thickness extending from the first surface, the first surface having a first opening extending completely through the first thickness of the mounting bracket, the first opening having a length direction and having one end that extends through an edge of the mounting bracket, the first opening being sized to receive a wheel axle and allow horizontal adjustment of the wheel axle;
       the mounting bracket having a second surface and defining a second thickness extending from the second surface, the second surface defining an elongate slot, the elongate slot passing completely through the second thickness;
       wherein the first opening and the elongate slot are defined by a unitary portion of the mounting bracket;
       a rear cycle wheel, the rear cycle wheel having a central hub and a wheel axle that rotatably supports the hub, the wheel axle defining a first axis, and the rear cycle wheel affixable to the cycle vehicle by securing the wheel axle at a selected location within the first opening;
   a power unit, the power unit having a drive source configured to rotationally power a drive wheel about a second axis, the second axis being positioned above the first axis, the power unit being slidably positionable in relation to the bracket and lockable to the mounting bracket in a first position and in a different second position within the elongate slot, the second axis being substantially parallel to the first axis when the power unit is positioned on the second surface, the power unit being positioned outside of the frame and adjacent the rear portion of the frame;
   a driven wheel, the driven wheel operably connected to the rear cycle wheel, the drive wheel operably connectable to the driven wheel such that power can be transferred from the drive wheel to the driven wheel;
   a gear reducer supported by the mounting bracket and operatively coupled to the power unit and the drive wheel; and
   a pedal drive system, the pedal drive system comprising a pedal crank rotatable about a pedal crank axis, which carries a chainring, and a driven sprocket, the pedal crank being operably connected to the driven sprocket, and the driven sprocket being operably connected to the rear cycle wheel so as to transfer force applied to the pedal crank to the cycle wheel;

wherein the seat tube is coupled to the down tube at a location forward of the pedal crank axis to provide space for a power kit comprising a battery that is received between the rear cycle wheel and the seat tube;

wherein movement of the power unit between a first and a second position permits adjustment of the distance between the drive wheel and the driven wheel, and the adjustment of the wheel axle permits adjustment of the distance between the chainring and the driven sprocket.

2. The powered cycle vehicle of claim 1, wherein the drive source is a motor and the power unit further comprises a motor bracket, wherein the motor is secured to the motor bracket and the motor bracket is slidably positionable and lockable to the mounting bracket by one or more fasteners positioned in the elongate slot.

3. The powered cycle vehicle of claim 1, further comprising a freewheel clutch, the freewheel clutch being configured to allow the rear cycle wheel to rotate without the power unit rotating.

4. The powered cycle vehicle of claim 1, wherein the elongate slot is curved.

5. The powered cycle vehicle of claim 1, wherein the elongate slot includes a straight portion.

6. The powered cycle vehicle of claim 1, wherein the driven wheel is one of a gear, a sprocket, or a pulley.

7. The powered cycle vehicle of claim 1, wherein the mounting bracket further comprises a second opening, the second opening being sized to receive a fastener, the fastener configured to support the power unit such that the power unit can be rotated about an axis of the fastener.

8. The powered cycle vehicle of claim 1, wherein the mounting bracket is welded to the frame.

9. The powered cycle vehicle of claim 1, further comprising an endless drive chain that drivingly couples the drive wheel and the driven wheel.

10. The powered cycle vehicle of claim 1, wherein the power unit and mounting bracket are configured so that the rear cycle wheel operably connected to the drive wheel can be removed from the cycle vehicle without removing the power unit from the cycle vehicle.

11. A powered cycle vehicle, the vehicle comprising:
a frame comprising a seat tube and a down tube;
a cycle wheel, having a wheel axle, the wheel axle defining a first axis, the wheel axle rotatably supporting the cycle wheel;
a driven wheel operably connected to the cycle wheel;
a mounting bracket fixedly supported by the frame, and the cycle wheel rotatably supported in a locked position by a first portion of the mounting bracket, the first portion of the mounting bracket configured to allow horizontal movement of the wheel axle with respect to the frame;
a power unit, the power unit having a motor and a drive wheel operably connected to the motor, the drive wheel drivingly coupled to the driven wheel by an endless drive loop; and
the power unit slidably positionable on a second portion of the mounting bracket that is unitary with the first portion to which the cycle wheel is attached to allow movement of the drive wheel in relation to the first axis to facilitate disengagement of the first endless drive loop from the driven wheel such that the cycle wheel can be removed from the mounting bracket, the power unit being positioned outside the frame;
a pedal drive system, the pedal drive system comprising a pedal crank rotatable about a crank axis and a driven sprocket, the pedal crank being operably connected to the driven sprocket by a second endless drive loop, and the driven sprocket being operably connected to the cycle wheel so as to transfer force from the pedal crank to the cycle wheel, and horizontal movement of the wheel axle facilitates disengagement of the driven sprocket from the second endless drive loop;

wherein the seat tube is coupled to the down tube at a location forward of the crank axis to provide space for a power kit supported between the seat tube and the rear cycle wheel.

12. The powered cycle vehicle of claim 11, the vehicle further comprising a freewheel clutch, wherein the freewheel clutch is operably connected between the motor and the cycle wheel.

13. The powered cycle vehicle of claim 12, wherein the freewheel clutch is operably attached to the cycle wheel.

14. The powered cycle vehicle of claim 11, wherein the power kit includes a case and a battery, the case having a cut-out portion defined by a rearward surface of the case, the cut-out portion being inwardly recessed to approximate the curvature of the cycle wheel.

15. The powered cycle vehicle of claim 14, wherein the cut-out portion extends entire width of the case.

16. A powered cycle vehicle, the vehicle comprising:
a frame, having a first mounting surface and a second mounting surface each defined by a unitary member of the frame;
a cycle wheel, having a wheel axle, the wheel axle rotatably supporting the cycle wheel and defining a rear wheel axis, and the cycle wheel rotatably supported in a first position by the first mounting surface, the first mounting surface being sized and shaped to allow the wheel axle to move in a horizontal direction with respect to the frame;
a driven wheel operably connected to the cycle wheel;
a power unit, the power unit having a motor and a drive wheel driven by the motor, the drive wheel operably connected to the driven wheel; and
the power unit movably positionable on the second mounting surface to allow adjustment of a position of the drive wheel in relation to the rear wheel axis to facilitate disengagement of the drive wheel from the driven wheel and removal of the cycle wheel from the first mounting surface;
a gear reducer incorporated within the power unit between the motor and the drive wheel to provide a compact drive assembly; and
a pedal drive system, the pedal drive system comprising a pedal crank, which carries a chainring, and a driven sprocket, the pedal crank being operably connected to the driven sprocket, and the driven sprocket being operably connected to the cycle wheel so as to transfer force applied to the pedal crank to the cycle wheel;
wherein the second mounting surface includes a recessed portion and the power unit includes an output shaft, the recessed portion providing a space for the drive wheel, wherein the second mounting surface includes a first opening and a slot which are located on opposite sides of the recessed portion.

17. The powered cycle vehicle of claim 16, the vehicle further comprising a freewheel clutch, wherein the freewheel clutch is operably connected between the motor and the cycle wheel.

18. The powered cycle vehicle of claim 17, wherein the freewheel clutch is operably attached to the cycle wheel.

* * * * *